United States Patent
Hughes, Jr. et al.

(10) Patent No.: US 9,866,997 B2
(45) Date of Patent: Jan. 9, 2018

(54) SYSTEMS AND METHODS FOR GEO-LOCATION BASED MESSAGE STREAMS

(71) Applicant: MapQuest, Inc., Denver, CO (US)

(72) Inventors: Joseph D. Hughes, Jr., Lancaster, PA (US); Simon Hill, Berkeley, CA (US); Joseph Barbara, Middletown, PA (US)

(73) Assignee: Mapquest, Inc., Denver, CO (US)

( * ) Notice: Subject to any disclaimer, the term of this patent is extended or adjusted under 35 U.S.C. 154(b) by 104 days.

(21) Appl. No.: 14/099,101

(22) Filed: Dec. 6, 2013

(65) Prior Publication Data

US 2015/0163630 A1    Jun. 11, 2015

(51) Int. Cl.
*H04W 4/02* (2009.01)
*H04W 4/20* (2009.01)

(52) U.S. Cl.
CPC .......... *H04W 4/021* (2013.01); *H04W 4/206* (2013.01)

(58) Field of Classification Search
None
See application file for complete search history.

(56) References Cited

U.S. PATENT DOCUMENTS

| | | | | |
|---|---|---|---|---|
| 8,385,964 B2 * | 2/2013 | Haney | ................. | H04M 3/4228 455/404.1 |
| 8,755,824 B1 * | 6/2014 | Wang | ................... | H04W 4/021 340/539.13 |
| 2007/0143013 A1 * | 6/2007 | Breen | ................... | G01S 5/0027 701/32.3 |
| 2010/0127919 A1 | 5/2010 | Curran et al. | | |
| 2011/0314144 A1 | 12/2011 | Goodman | | |
| 2012/0008526 A1 * | 1/2012 | Borghei | ................ | H04W 4/021 370/254 |
| 2012/0058826 A1 * | 3/2012 | Amaitis | .............. | G07F 17/3218 463/42 |
| 2012/0270563 A1 * | 10/2012 | Sayed | ................... | H04W 4/021 455/456.3 |
| 2012/0324018 A1 * | 12/2012 | Metcalf | ................. | H04W 4/206 709/206 |
| 2013/0085861 A1 * | 4/2013 | Dunlap | ................... | G01S 19/34 705/14.58 |
| 2013/0091452 A1 * | 4/2013 | Sorden | .................... | G06F 3/048 715/771 |

(Continued)

OTHER PUBLICATIONS

International Search Report and Written Opinion dated Feb. 20, 2015, in corresponding International Application No. PCT/US14/67695 filed on Nov. 26, 2014 (12 pages).

(Continued)

*Primary Examiner* — Hilina K Demeter (57) ABSTRACT

Systems and methods are provided for communicating virtual messages through a location-based message stream for different mobile device users. A geo-fenced area surrounding a desired geographic location for a virtual message stream is generated based on parameters received from a first user. The parameters include at least one message to be sent to one or more recipients via the message stream. When a mobile device of a second user located within the generated geo-fenced area is detected and the second user is determined to be one of the message recipients, the message from the message stream is transmitted to the detected mobile device of the second user.

18 Claims, 6 Drawing Sheets

(56) References Cited

U.S. PATENT DOCUMENTS

| | | | | |
|---|---|---|---|---|
| 2013/0165152 A1* | 6/2013 | Nichols | ............ | H04L 67/306 455/456.3 |
| 2013/0225196 A1 | 8/2013 | James et al. | | |
| 2013/0331087 A1* | 12/2013 | Shoemaker | ............ | H04L 67/125 455/420 |
| 2014/0128095 A1* | 5/2014 | Finlow-Bates | ............ | H04W 4/021 455/456.1 |
| 2014/0162693 A1* | 6/2014 | Wachter | ............ | H04W 4/04 455/456.3 |
| 2014/0171013 A1* | 6/2014 | Varoglu | ............ | H04W 4/021 455/404.2 |
| 2014/0213304 A1* | 7/2014 | Beckett | ............ | H04W 4/021 455/456.6 |
| 2014/0278860 A1* | 9/2014 | Lee | ............ | G06Q 30/0214 705/14.16 |
| 2014/0308977 A1* | 10/2014 | Cheung | ............ | H04W 4/021 455/456.3 |
| 2014/0364103 A1* | 12/2014 | Marti | ............ | H04W 4/021 455/418 |

OTHER PUBLICATIONS

Martellaro, J., "Set up a Geofence Reminder on Your iPhone", article, Apr. 16, 2013, <http://www.macobserver.com/tmo/article/set-up-a-geofence-reminder-on-your-iphone> (6 pages).

* cited by examiner

SYSTEMS AND METHODS FOR GEO-LOCATION BASED MESSAGE STREAMS

TECHNICAL FIELD

The present disclosure relates generally to location-based services for mobile device users, and more particularly, to providing messaging services to particular mobile device users based on their respective geographic locations.

BACKGROUND

Interactive electronic maps and mapping applications allow users to find information related to various points of interest (POIs) at or near a particular geographic location. A POI may be, for example, a specific business, destination, landmark, or venue that may be of interest to an individual or a group of individuals. For example, a mapping application may be executable at a user's mobile device, such as a smartphone, which may be equipped with a Global Positioning System (GPS), thereby allowing the user to find POIs that may be located near the user's current geographic location, as determined using the device's GPS. Additionally, such a mapping application may be integrated with a social networking service and allow the user to "check-in" at a particular location or POI and send messages or notifications related to the particular POI to other users of the social networking service who may be linked to the user, for example, as social connections within the social networking service.

However, conventional mapping applications or social networking services generally broadcast check-in notifications and any messages related to a particular POI to all of the social connections associated with a user within a social network, regardless of the geographic location of any individual user with respect to the POI. Thus, a user of such a conventional mapping application or social network service generally does not have an efficient way to send messages related to a particular location or POI to specific users based on their respective geographic locations. Furthermore, the check-in and messaging functionality provided by such conventional mapping applications are generally limited to specific POIs, e.g., business locations, which have been predefined by the mapping application or social networking service.

SUMMARY OF THE DISCLOSURE

Embodiments disclose systems and methods for providing virtual messages through a location-based message stream.

According to certain embodiments, computer-implemented methods are disclosed for providing virtual messages through a location-based message stream. In an exemplary method, parameters for a message stream to be associated with a desired geographic location are received from a computing device of a first user via a network. The parameters include at least one message to be sent to one or more recipients via the message stream. A geo-fenced area surrounding the desired geographic location is generated for the message stream based on the received parameters. Upon detecting a presence of a mobile device of a second user within the generated geo-fenced area, it is determined whether the second user is any of the one or more recipients. The message is transmitted to the detected mobile device of the second user, when the second user is determined to be at least one of the one or more recipients.

According to certain embodiments, systems are disclosed for providing virtual messages through a location-based message stream. One system includes a memory having processor-readable instructions stored therein; and a processor configured to access the memory and execute the processor-readable instructions, which when executed by the processor configures the processor to perform a plurality of functions, including functions to: receive, from a computing device of a first user via a network, parameters for a message stream to be associated with a desired geographic location, where the parameters include at least one message to be sent to one or more recipients via the message stream; generate a geo-fenced area surrounding the desired geographic location for the message stream based on the received parameters; detect a presence of a mobile device of a second user located within the generated geo-fenced area; determine whether the second user is any of the one or more recipients based on the detection; and transmit the message to the detected mobile device of the second user, when the second user is determined to be at least one of the one or more recipients.

According to certain embodiments, a computer readable medium is disclosed as storing instructions that, when executed by a computer, cause the computer to perform functions to: receive, from a computing device of a first user via a network, parameters for a message stream to be associated with a desired geographic location, where the parameters include at least one message to be sent to one or more recipients via the message stream; generate a geo-fenced area surrounding the desired geographic location for the message stream based on the received parameters; detect a presence of a mobile device of a second user located within the generated geo-fenced area; determine whether the second user is any of the one or more recipients based on the detection; and transmit the message to the detected mobile device of the second user, when the second user is determined to be at least one of the one or more recipients.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

The present disclosure is directed to overcoming one or more of the above referenced issues. Specifically, the present disclosure is directed to providing location-based message streams for sharing information related to a desired location or POI between users of a messaging or social networking service based on each user's geographic location with respect to the location, related POI, or related perimeter. In an example, a virtual perimeter, e.g., in the form of a geo-fence, may be generated around a desired geographic location for a message stream, based on parameters specified by a user of a social networking service. The desired geographic location may be, for example, any location within a geographic region that is specified by the user for generating such a location-based message stream. The parameters specified by the user may include, for example, location data, e.g., geographic (latitude and longitude) coordinates corresponding to the desired geographic location. Such location data may be captured by, for example, a GPS of the user's mobile device at a particular point in time. Further, the desired geographic location may correspond to, for example, the location of a business (e.g., a restaurant), venue, or other POI for which the user would like to leave information, e.g., for the user to recall at a later time or to share with other users. Accordingly, the parameters may include a message and one or more message recipients that may be specified by the user. As used herein, the term "specified recipient" may refer to any general user of the location-based message stream functionality (e.g., as provided by a web service), who is determined to be within a geo-fenced area corresponding to a location-based message stream (e.g., based on the current geographic location of the user's mobile device). As such, it should be noted that a "specified recipient" of a message posted to a location-based message stream, e.g., a public message stream, as will be described in further detail below, is not necessarily a specific user identified explicitly by the first user initiating the location-based message stream and creation of the corresponding geo-fenced area. It should also be noted that the message delivered to each message recipient may include any type of content in any of various formats including, but not limited to, text, images, audio, or graphics content.

As will be described in further detail below, benefits of the present disclosure include, but are not limited to, enabling a space and time based messaging service, providing a communication interface for particular users (e.g., members of a particular social group within a social networking service) to share information related to a particular geographic location or POI based on each user's physical location with respect to the desired geographic location or POI, and facilitating virtual conversations between different users through location-based message streams or communication channels.

Reference will now be made in detail to the exemplary embodiments of the disclosure, examples of which are illustrated in the accompanying drawings. Wherever possible, the same reference numbers will be used throughout the drawings to refer to the same or like parts.

Figure 1A:
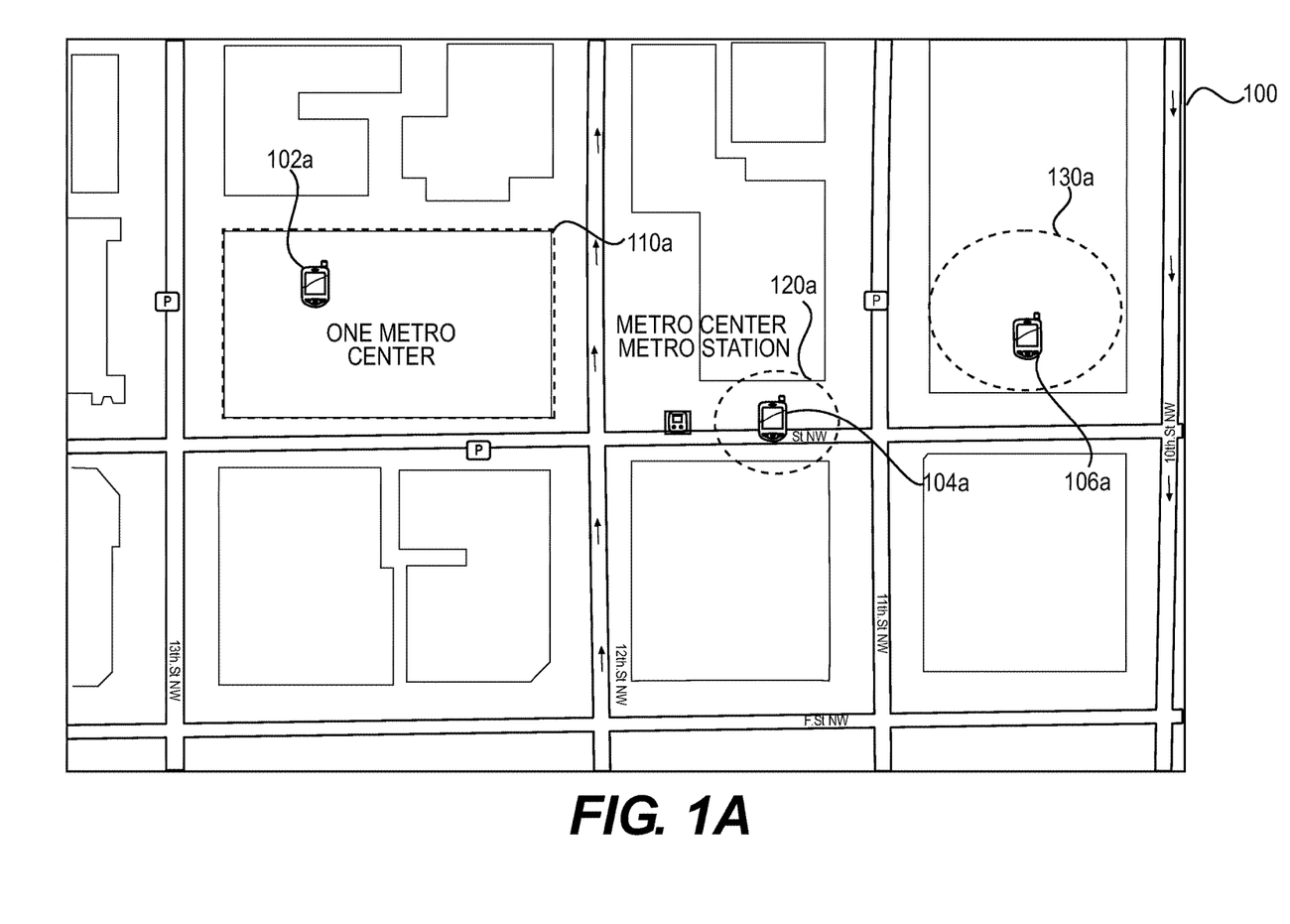
FIG. 1A is a view of an electronic map showing multiple geo-fenced areas corresponding to various location-based message streams for enabling different users to share location-based information between one another.

FIG. 1A is a view of an electronic map 100 showing multiple geo-fenced areas corresponding to various location-based message streams for enabling different users to share location-based information between one another. As shown in FIG. 1A, map 100 includes a geo-fenced area 110a, a geo-fenced area 120a, and a geo-fenced area 130a. Also, as shown in FIG. 1A, map 100 indicates the geographic locations of a mobile device 102a, a mobile device 104a, and a mobile device 106a within the geo-fenced areas 110a, 120a, and 130a, respectively. In an example, each of mobile devices 102a, 104a, and 106a may be a mobile computing device equipped with a GPS receiver for registering GPS location data, e.g., latitude and longitude coordinates, at a particular point or period of time. Examples of such a mobile computing device include, but are not limited to, a laptop computer, tablet computer, mobile handset, smartphone, personal digital assistant (PDA), dedicated GPS device, or similar type of mobile device.

It should be noted that the physical or geographic location of mobile devices 102a, 104a, or 106a may be obtained or estimated using any of various well-known techniques for deriving such geographic location information in place of or in combination with GPS. Examples of such other techniques include, but are not limited to, cell identification (e.g., using Cell ID), cellular tower triangulation, multilateration, Wi-Fi, and any other network or handset based technique for deriving or estimating the physical or geographic location of a mobile device.

Each of geo-fenced areas 110a, 120a, and 130a may be a virtual perimeter or boundary of any shape or size around a desired geographic location. The desired geographic location may correspond to, for example, a geographic location of mobile devices 102a, 104a, and 106a, respectively. Alternatively, the desired geographic location may correspond to, for example, the location of a venue, public landmark, commercial business (e.g., a restaurant, store, etc.), or other POI. As shown in FIG. 1A, the shape and size of geo-fenced area 110a may correspond to the shape and size of the corresponding place or POI or building associated therewith. However, the shape and size of each of geo-fenced areas 120a and 130a may be based on a predetermined radius with respect to the desired geographic location.

In an example, a virtual boundary for each of geo-fenced areas 110a, 120a, and 130a may be defined by parameters specified by one or more users of mobile devices 102a, 104a, and 106a, respectively. As will be described in further detail below, the parameters may be specified by each user via, for example, a client application executable at each of mobile devices 102a, 104a, and 106a. The client application executable at each user's device in this example may communicate via a communication network with an associated server that hosts a service for providing the location-based message stream functionality described herein.

The user-specified parameters for a location-based message stream may include, for example, the desired geographic location or POI to be associated with the stream, as described above, in addition to other parameters defining a virtual boundary of the corresponding geo-fenced area. In an example, the user-specified parameters may specify a predetermined or default radius value for generating a geo-fenced area for a location-based message stream to be associated with a specified location or POI. In another example, the user-specified parameters may include a set of location points or dimensions for a customized geo-fence encompassing the desired geographic location or POI. In some implementations, the set of location points or dimensions may be generated by a mapping application executable at a computing device (e.g., mobile device 102a, 104a, or 106a) of each user based on user input via a graphical user interface (GUI) of the mapping application. For example, each user may specify a custom boundary for a geo-fenced area by drawing a line representing the boundary around the area directly on an electronic map displayed within the mapping application. The user input received by the mapping application in this example may be from a user input device coupled to the user's device. Examples of such a user input device include, but are not limited to, a touch-screen display, a mouse, keyboard, microphone, or other similar types of user input devices.

As noted previously, and as will be described in further detail below, the location-based message streams may be used, for example, to leave information for each user to recall at a later time or to share with other users. In an example, location-based message stream functionality described herein enables an individual user to bookmark a specified location at a particular time for purposes of recalling information associated with the bookmarked location at a later time. For example, the user may wish to leave herself a note at a bookmarked location to be displayed at the user's device via a location-based message stream, e.g., while traveling along a predetermined route. The display of the note at the user's mobile device may be triggered automatically when the user travels along the same route at a later time. The message may include information in any of various formats including, but not limited to, text, a universal resource locator (URL) link, image, audio, video, and/or other type of media content. In another example, the bookmarked location may be near an entrance to a grocery store, and the user may leave a virtual note or message to herself, which includes a grocery list of items that the user intends to purchase when visiting the particular grocery store, e.g., during a subsequent trip to the store.

In an example, the parameters specified by each of the users of mobile devices 102a, 104a, and 106a may also include at least one message to be shared with one or more message recipients. The respective users of mobile devices 102a, 104a, and 106a may specify recipients of messages for a location-based message stream initiated by each user by, for example, specifying a unique identifier associated with the message recipient. Examples of such a unique identifier include, but are not limited to, a name, email address, phone number (e.g., mobile phone number associated with each recipient), or other unique identifier associated with a particular message recipient.

In a further example, users of mobile devices 102a, 104a, and 106a may be members of a social networking service and the message recipients specified by each user may be other users of the social networking service. Such other users may be, for example, general or public users of the social networking service with whom a user of mobile device 102a, 104a, or 106a wishes to share the message. Additionally or alternatively, such other users may be, for example, members of a social group associated with the user of mobile device 102a, 104a, or 106a within the social networking service (e.g., other users who may also be the user's friends or family members). Such other users or members of the social group associated with the user of mobile device 102a, 104a, or 106a in this example may be identified based on, for example, predefined links in a social graph or set of contacts associated with the user within the social networking service.

In the examples described above, each of the message recipients of the respective message streams corresponding to geo-fenced areas 110a, 120a, and 130a may receive the virtual message of the stream when a mobile device of the message recipients is detected within the corresponding geo-fenced areas 110a, 120a, and 130a. Further, each of the message recipients may be able to leave additional virtual messages of their own via, for example, an application or other messaging interface that may be associated with the location-based message stream functionality described herein and that may be executable at each recipient's mobile device. The additional messages may then be provided or made available for display to the users of mobile devices 102a, 104a, or 106a as well as the respective mobile devices of any other recipients of the original virtual message associated with the stream, as specified by user 102a, 104a, or 106a, when the mobile device of each user is detected within geo-fenced areas 110a, 120a, or 130a, respectively.

In an example, the user-specified parameters for each location-based message stream, e.g., corresponding to each of geo-fenced areas 110a, 120a, and 130a, may include a scope of the message stream or each message added to the stream. The specified scope of the message stream may be, for example, private or public. In an example, a user of a social networking service may specify parameters for a private location-based message stream accessible to only particular users of the social networking service, as specified by the first user and who are located within the corresponding geo-fenced area. The message recipients or other users specified by the first user in this example may be members of a social group associated with the first user within the social networking service, as described above.

On the other hand, messages of a location-based message stream having a public scope may be accessible to any user of the social networking service, regardless of their affiliation or association with the first user who may have initially created the message stream. As will be described in further detail below with respect to FIG. 2, such a public location-based message stream may be generated based on parameters specified by, for example, a public agency or authorized organization affiliated with a municipality or government agency.

Also, as will be described in further detail below with respect to FIG. 1B, location-based message streams may be generated for different users within an existing location-based message stream. However, it should be noted that any new message streams generated within an existing message stream may be set to a different scope than the existing stream, for example, in order to avoid any conflicts or issues with respect to the availability of message streams of varying scope to users at the same general physical location or geo-fenced area. For example, users may be enabled to create private message streams only within an existing public message stream. Alternatively, users may be enabled to only post public messages only to a public stream of a geo-fenced area within which they are currently located, e.g., to avoid creating multiple conflicting public streams or geo-fenced areas.

Figure 1B:
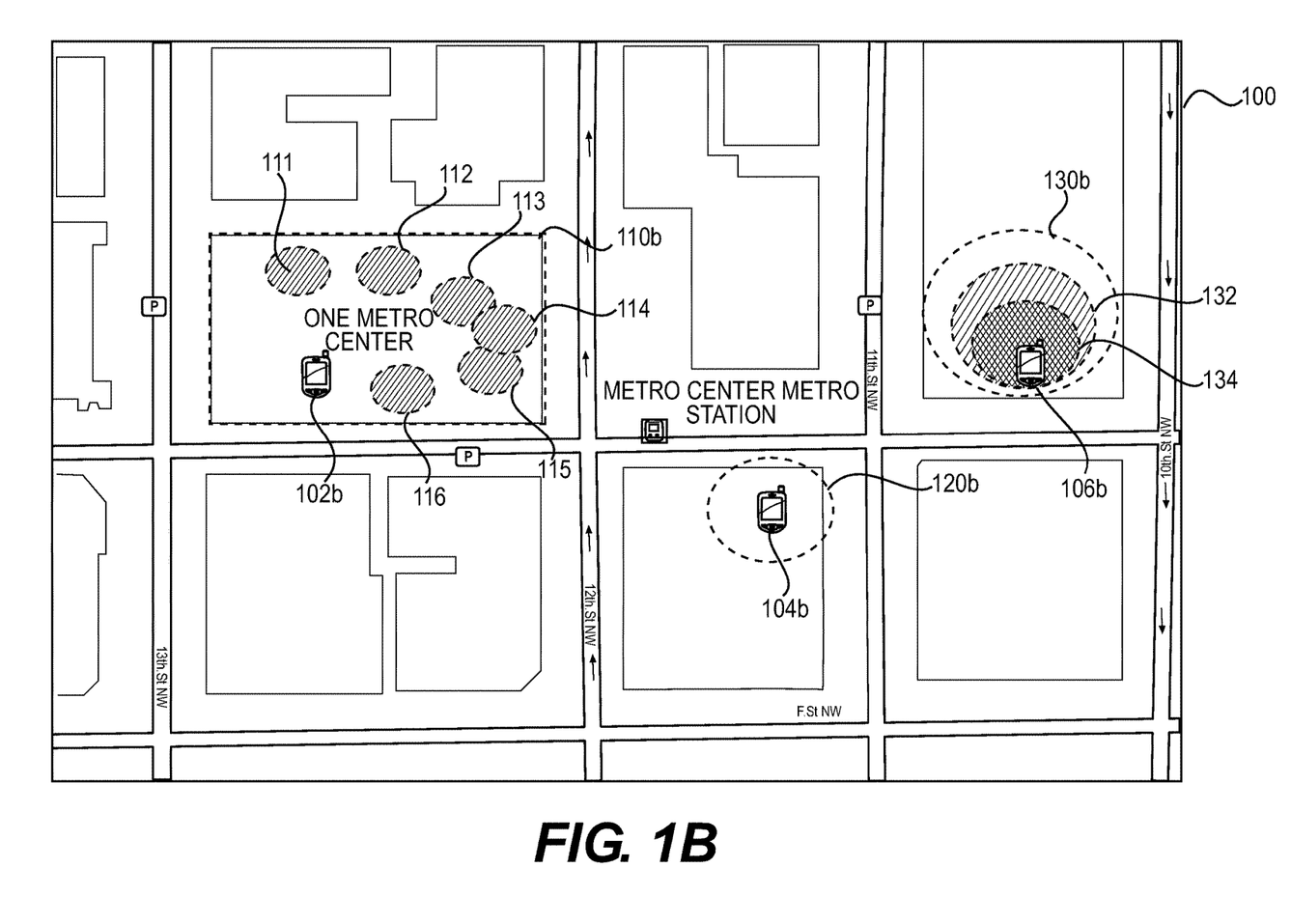
FIG. 1B is another view of the electronic map shown in FIG. 1A, including nested geo-fenced areas corresponding to different location-based message streams of varying scope.

FIG. 1B is another view of the electronic map 100 of FIG. 1A, which includes nested geo-fenced areas corresponding to different location-based message streams of varying scope. For purposes of this example, geo-fenced areas 111, 112, 113, 114, 115, and 116, as shown in FIG. 1B, may correspond to different private message streams within a public message stream corresponding to a geo-fenced area 110*b*. Similarly, geo-fenced areas 132 and 134 may correspond to different private message streams within a public message stream corresponding to a geo-fenced area 130*b*. The message stream corresponding to a geo-fenced area 120*b* may have either a public or private scope, e.g., as initially specified by the user of a mobile device 104*b*.

In an example, geo-fenced area 110*b* may have been generated for a public location-based message stream based on parameters specified by a public authority, e.g., a public transit authority or government agency for purposes of disseminating general information or public alerts related to a local transit system in the form of messages via the message stream. The first user (e.g., the public transit authority) in the above example may allow also individual users (e.g., members of the general public who use the transit system) to create their own private location-based message streams within geo-fenced area 110*b*.

Geo-fenced areas 111, 112, 113, 114, 115, and 116 may therefore correspond to different private message streams associated with different users, and which may be based on parameters specified by each user for the corresponding to private message streams. Thus, each user may leave or post a message to the message stream to be recalled by the user at a later time or to be sent to one or more message recipients, when a mobile device (e.g., mobile device 102*b*) of each user or message recipient is detected within the appropriate geo-fenced area. While specified message recipients generally may be allowed to post their own messages to a particular message stream, the first user who initiated a public location-based message stream and creation of the corresponding geo-fenced area may restrict the ability of one or more specified message recipients to post messages to the message stream. For example, the first user may allow only certain users who may also be members of a particular social group associated with the first user within a social networking service, as described above. While geo-fenced areas 111-116 are depicted as being smaller than and encompassed within geo-fenced area 110*b*, it should be noted that geo-fenced areas 111-116 are not intended to be limited thereto and that any of these geo-fenced areas may be coextensive, have overlapping boundaries, or even be larger than geo-fenced area 110*b*, while still being selectively less public (e.g., have a relatively smaller scope) than geo-fenced area 110*b*.

In the example shown in FIG. 1B, a user of mobile device 102*b* may be a specified recipient of messages posted to a private message stream corresponding to geo-fenced area 111. Accordingly, when mobile device 102*b* is detected within geo-fenced area 111, the messages posted to the corresponding message stream may be transmitted to mobile device 102*b*. The messages may be displayed to the user via, for example, a GUI of a client application executable at mobile device 102*b*. As mobile device 102*b* would also be detected as being located within geo-fenced area 110*b*, any messages posted to the corresponding public message stream in this example would also be delivered to mobile device 102*b*. Similarly, a user of mobile device 106*b* may receive public messages posted to the public location-based message stream corresponding to geo-fenced area 130*b*. However, messages posted to either of the private message streams corresponding to geo-fenced area 132 or geo-fenced area 134 may be transmitted to mobile device 106*b* only if the user qualifies as a specified recipient of messages within each stream, e.g., as specified by a user of mobile device 102*a* of FIG. 1A, who may have initiated the message stream or its creation, as described above. As noted previously, each of geo-fenced areas 132 and 134 may be of any size or shape relative to geo-fenced area 130*b*.

In some implementations, the parameters specified for messages posted to a message stream may include, for example, tags or keywords that may be associated with each message and used for purposes of filtering a plurality of messages posted to a message stream according to a particular tag or keyword. The tags or keywords associated with a message may be representative of a particular topic or subject category corresponding to the message. The same tag or keyword may also be associated with each message in the same location-based message stream or each message posted by a particular user so as to identify all messages posted to a particular message stream or by the particular user. Such a tag feature may allow a user to filter or limit the number of messages transmitted to the user's mobile device, which may be particularly beneficial for some users (e.g., the user of mobile device 106*b*) who may qualify as a specified recipient for multiple message streams, e.g., corresponding to nested geo-fenced areas (e.g., geo-fenced area 132 and 134) within a larger geo-fenced area (e.g., geo-fenced area 130*b*), as described above.

In some implementations, only messages posted to a particular message stream (e.g., corresponding to any of geo-fenced areas 110*b* or 111-116) within a predetermined time period may be transmitted to mobile device 102*b* so as to ensure that only the most recent messages are delivered to message recipients. The predetermined time period may be, for example, one of the parameters specified by the initial user who initiated the location-based message stream and creation of the corresponding geo-fenced area. In an example, the user initiating a location-based message stream and associated geo-fenced area may also specify an expiration time for the message stream itself, after which the message stream may be deactivated or removed. Further, in some implementations, any user who may be able to post messages to a message stream may be able to specify an expiration time for individual messages posted by the user to the message stream.

Figure 2:
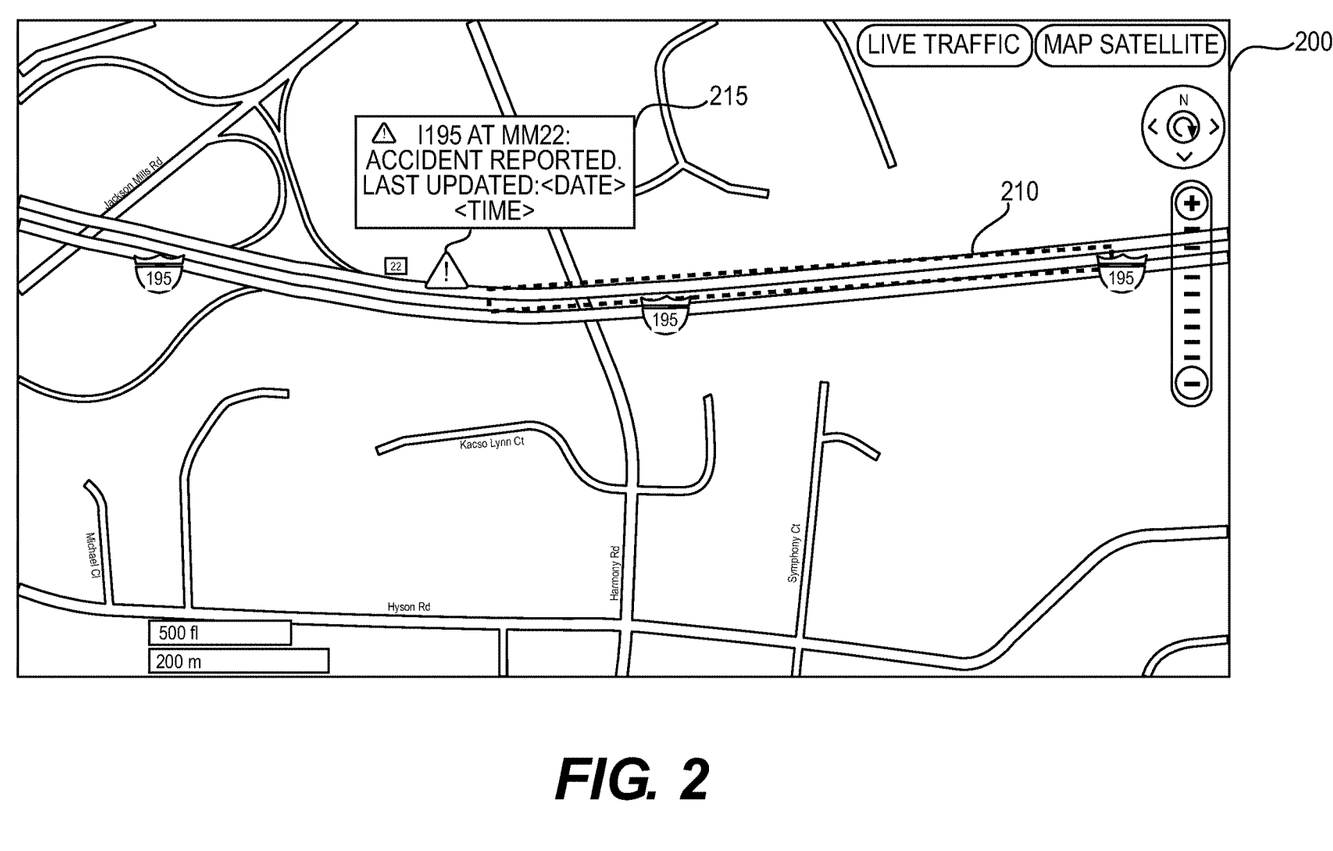
FIG. 2 is a view of another electronic map illustrating a customized geo-fenced area for a location-based message stream targeting particular message recipients.

FIG. 2 is a view of another electronic map 200 illustrating a customized geo-fenced area 210 for a location-based message stream, e.g., which may be used for targeting particular message recipients. The targeted message recipients may be, for example, mobile device users traveling along the portion of a highway or public road, as depicted in the example shown in FIG. 2, and the location-based message stream corresponding to geo-fenced area 210 may be a public message stream associated with a transportation authority or other public agency affiliated with a local municipality or government. The public location-based message stream in this example may be used by the transportation authority to send traffic alerts or notifications to the mobile device users traveling along the highway. In an example, the mobile device users may have previously subscribed to receive such alerts and other messages posted to the public location-based message stream associated with the highway. Each user in this example may be sent a traffic alert, such as an alert 215, as shown in FIG. 2, when the user's mobile device is detected within geo-fenced area 210. Such alerts may be used, for example, to notify certain users/subscribers of the highway's public message stream of an upcoming traffic incident or road condition targeted to receive the alerts based on each user's current geographic location and route of travel along the highway, e.g., as estimated based on location and time information captured using a GPS and/or other sensors of each user's mobile device. The alerts may be displayed at the user's mobile device via, for example, a client application or third-party messaging interface executable at the device. In some implementations, the users/recipients of messages posted to the public message stream in this example may also use the client application to post their own messages to the public message stream, e.g., for purposes of reporting traffic incidents or road conditions for other users/subscribers of the highway's public message stream who may be traveling along the highway behind the reporting user's current location.

In another example, a user may be able to initiate a private message stream for another geo-fenced area (not shown), which may either be located within geo-fenced area 210 or at a different portion along the highway. The private message stream and geo-fenced area may be used to leave personal messages, e.g., as location markers, at certain points along a user's current route of travel for purposes of recalling relevant information that the user may find useful to remember at a later time, when travelling along the same route. The user also may be able to specify one or more recipients of a message to be sent via the private message stream when a mobile device of each recipient is detected within the corresponding geo-fenced area. In addition to the particular recipients for messages posted to the message stream, the user may also be able to specify a time or location parameter for the message stream. Such a parameter may enable the user to specify a relative geographic location for the location-based message stream. For example, the geographic location to be associated with the location-based message stream may be a predetermined distance or travel time (e.g., drive time by car) relative to the current geographic location of the user or user's mobile device. The predetermined distance or travel time may correspond to a location along the user's current route of travel, which is either ahead of or behind the user's current geographic location-based on the parameter specified by the user. The user's route of travel and current location along the route may be tracked or monitored, e.g., on a periodic basis or for a predetermined period of time, by the client application or service providing the location-based message stream functionality described herein.

Figure 3:
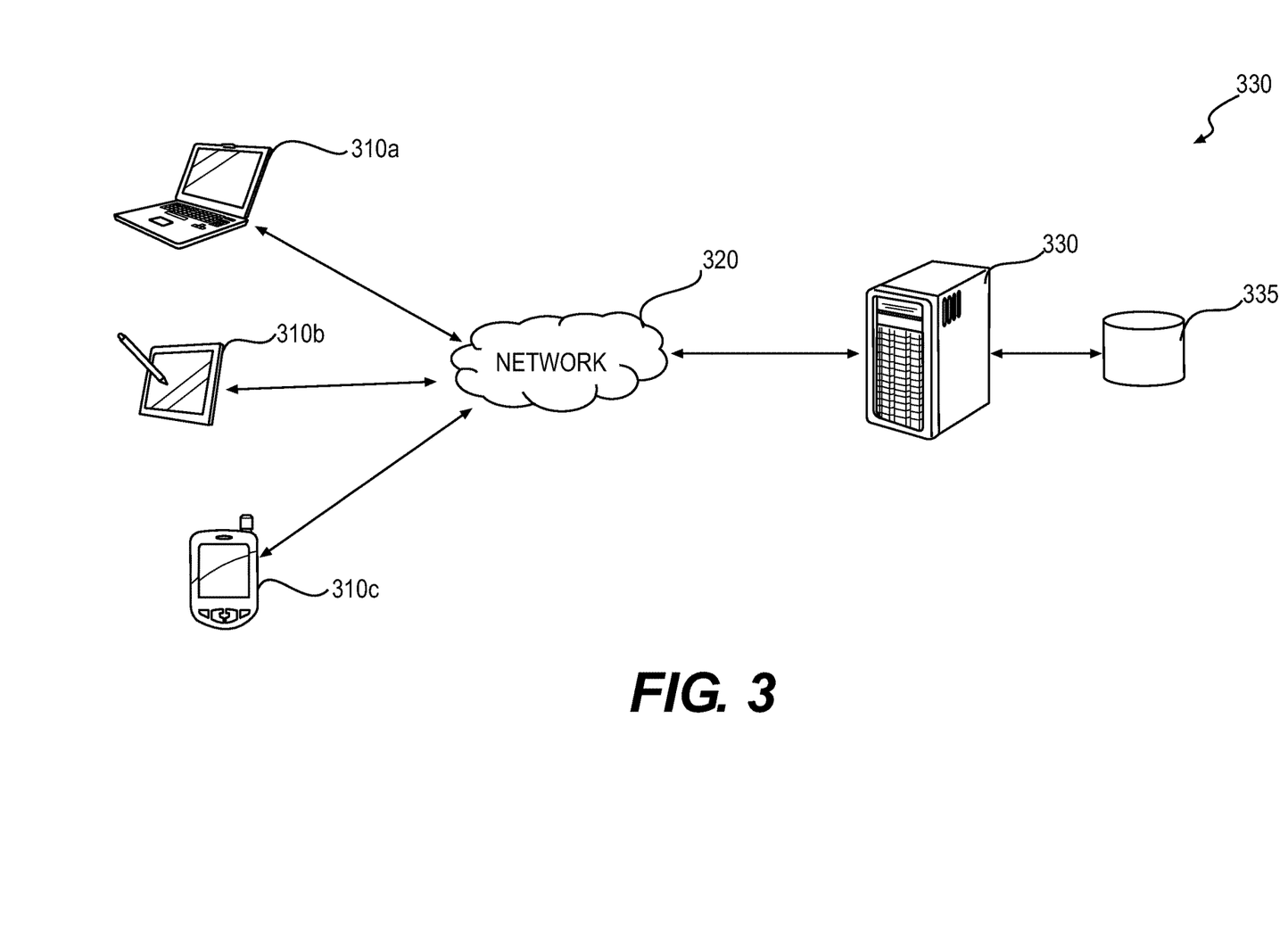
FIG. 3 is a block diagram of an exemplary communication system suitable for practicing embodiments of the present disclosure.

FIG. 3 is a block diagram of an exemplary communication system 300 suitable for practicing embodiments of the present disclosure. As shown in FIG. 3, system 300 includes mobile devices 310*a*, 310*b* and 310*c*, a server 330, a data store or database 335, all of which may be communicatively coupled via an electronic network 320. Network 320 may be any type of electronic network or combination of networks used for communicating digital content and data between various computing devices. Network 320 may be, for example, a local area network, a medium area network, or a wide area network, such as the Internet. While only mobile devices 310*a*, 310*b* and 310*c* are shown in FIG. 3, system 300 may include any number of user devices, all of which may be communicatively coupled via network 320. Likewise, while only server 330 and database 335 are shown in FIG. 3, system 300 may include any number of servers and/or databases or data storage devices as desired for a particular implementation.

Each of mobile devices 310*a*, 310*b*, and 310*c* may be any type of mobile computing device configured to send and receive various types of content and data to and from different types of computing devices via network 320. Examples of such content and data include, but are not limited to, text, multimedia content (including images and/or audio files), and content and data associated with one or more websites, e.g., which may be loaded and displayed within a web browser or other application executable at each of mobile devices 310*a*, 310*b*, and 310*c*. Examples of such a mobile computing device include, but are not limited to, a laptop computer, a mobile handset, a personal digital assistant (PDA), a cellular telephone, a network appliance, a camera, a smart phone, an enhanced general packet radio service (EGPRS) mobile phone, a media player, a navigation device, a portable game console, or any combination of these computing devices or other types of mobile computing devices having at least one processor, a local memory, a display, one or more user input devices, and a network communication interface. The user input device(s) may include any type or combination of input/output devices, such as a display monitor, touchpad, touchscreen, microphone, camera, keyboard, and/or mouse.

Accordingly, in the example shown in FIG. 3, mobile device 310*a* may be, for example, a laptop or similar type of mobile personal computer, mobile device 310*b* may be, for example, a tablet computer or similar type of mobile computing device having a touchscreen display, and mobile device 310*c* may be, for example, a mobile handset, smartphone, PDA, or similar type of device. However, it should be noted that mobile devices 310*a*, 310*b*, and 310*c* are not intended to be limited thereto.

Referring back to FIGS. 1A and 1B, as described above, each of mobile devices 102*a*, 104*a*, and 106*a* of FIG. 1A and mobile devices 102*b*, 104*b*, 106*b* of FIG. 1B may be implemented using, for example, any of mobile devices 310*a*, 310*b*, or 310*c*. In some implementations, each of mobile devices 310*a*, 310*b*, and 310*c* may be equipped with a GPS or other type of system for capturing location data that may be used to determine or estimate a current geographic location of the device at a particular point in time. As described above, examples of such other location determining systems for each of mobile devices 310*a*, 310*b*, and 310*c* include, but are not limited to, cell-ID, triangulation, and multilateration. Mobile devices 310*a*, 310*b*, and 310*c* may be configured to use GPS and/or any combination of other location determining systems that may be available to each device in order to capture location data and/or determine the geographic location of the device at any given time, particularly in areas (e.g., dense urban canyons) where the use of one or more of these location determining systems may not be available or feasible at the time. The location determining system(s) of each device may also be used to track or monitor the physical or geographic location of the device as it periodically changes over a period of time, e.g., according to the physical movement of a user who is carrying the device and traveling between different geographic locations.

Server 330 may be, for example, any of various types of servers including, but not limited to, a web server or an application server. However, it should be noted that server 330 may be implemented using any general-purpose computer capable of serving data to other computing devices including, but not limited to, mobile devices 310*a*, 310*b*, 310*c* or any other computing device (not shown) via network 320. Thus, server 330 may be implemented using any computing device having at least one processor and memory for executing and storing instructions. The memory may include any type of random access memory (RAM) or read-only memory (ROM) embodied in a physical storage medium, such as magnetic storage including floppy disk, hard disk, or magnetic tape; semiconductor storage such as solid state disk (SSD) or flash memory; optical disc storage; or magneto-optical disc storage. Software may include one or more applications and an operating system. Hardware also may include, but is not limited to, an output device, e.g., a display device coupled thereto, for displaying relevant information to a user and a user input device, e.g., a mouse, keyboard, or touchscreen display, for receiving input from the user.

In some implementations, server 330 may be implemented using multiple servers or general purpose computing devices, e.g., having multiple processors and multiple shared or separate memory components within a clustered computing environment or server farm. Thus, while not shown in FIG. 3, server 330 may be implemented using multiple servers (e.g., in a server farm), which may be communicatively coupled to each other via network 320 or a private local area network (not shown). Furthermore, server 330 may be communicatively coupled to one or more databases or data storage devices (not shown) in addition to database 335. Such data storage devices may be used to store any type of data or content accessible by server 330. Such data or content may include, for example and without limitation, one or more messages of a location-based message stream to be provided for the respective users of mobile devices 310a, 310b, or 310c via network 320.

In an example, server 330 may be configured to host a web service that provides the location-based message stream functionality described herein for the respective users of mobile devices 310a, 310b, and 310c via network 320. In some implementations, each of mobile devices 310a, 310b, and 310c may be configured to execute a client application that enables each user to invoke the functionality provided by such a location-based message stream service at mobile devices 310a, 310b, and 310c.

In some implementations, the web service or client application executable at each device may be integrated with a social networking service, which allows the user at each device to specify other users of the social networking service as recipients of messages posted to a location-based message stream created initially for the user. The other users of the social networking service who are specified as message recipients by the first user may be, for example, members of a social group associated with the first user within the social networking service, as described previously. Further, the web service or client application may also be integrated with a mapping application or service, e.g., thereby enabling the user to access different mapping functions via the client application executable at each of mobile devices 310a, 310b, and 310c. The aforementioned social networking and mapping services may also be hosted at server 330 or at one or more other servers (not shown), with which server 330 or the location-based message stream service hosted at server 330 communicates for providing social networking and mapping features of the location-based message stream functionality described herein. Further, these services may be provided by one or more third-party service providers, e.g., which may provide an application programming interface for implementing relevant features with the location-based message functionality of the service hosted at web server 330, as described herein.

In a further example, the respective users of mobile devices 310a, 310b, and 310c may use a GUI of the client application to specify parameters for a virtual message stream to be associated with a desired geographic location. The desired geographic location may be based on, for example, location information registered at a particular time by a GPS or other location determining system of each device, as described above.

Each user in the above example may also use the GUI of the client application executable at each of mobile devices 310a, 310b, and 310c to view and post messages to a location-based message stream associated with a particular geographic location. The GUI of the client application may be configured to present the content of one or more messages to a user at each device via a display of the respective user devices 310a, 310b and 310c. Further, the GUI may be integrated with the displayed map and/or geo-fenced areas. The GUI of the client application may include various control elements enabling each user to specify parameters, e.g., for a web service hosted at server 330 via network 320, and invoke the location-based message stream functionality provided by the service, as described above. Examples of different parameters that may be specified by each user include, but are not limited to, a desired geographic location to be associated with a new location-based message stream, at least one message to be added or posted to the message stream, one or more recipients of the message(s) of the message stream, a scope of the messages and/or message stream to be provided to the specified recipients, and dimensions defining a size and shape of a virtual boundary for a geo-fenced area corresponding to the message stream.

The messages posted to the stream may be delivered by server 330 (or web server hosted at server 330) to each of mobile devices 310a, 310b, or 310c when the mobile device is detected within a geo-fenced area corresponding to the location-based message stream, as described above. In an example, server 330 may be configured to push all of the messages of a message stream to each of mobile devices 310a, 310b, and 310c via network 320, upon detecting the mobile devices located within the geo-fenced area corresponding to the message stream. In some implementations, server 330 may be configured to push only a predetermined number of messages, e.g., to avoid any performance issues associated with sending a relatively large number of messages posted to the message stream to any of mobile devices 310a, 310b, and 310c via network 320. However, it should be noted that any type of messaging scheme may be used to provide messages from the message stream to each of mobile devices 310a, 310b, and 310c via network 320. For example, each of mobile devices 310a, 310b, and 310c may be configured to pull or request the messages from server 330 or database 335 via network 320 when the current geographic location of the device of determined to be within the geo-fenced area corresponding to the message stream.

In some implementations, the location-based message stream service hosted at server 330 or client application executable at each of mobile devices 310a, 310b, and 310c may be configured to provide messages posted to a message stream via a messaging interface, e.g., as provided by an operating system or a third-party application executable at each device. Such a messaging interface may be provided by, for example, a third-party messaging application executable at each of mobile devices 310a, 310b, and 310c. In a different example, such a messaging interface may be provided as part of a third-party social networking application executable at each of mobile devices 310a, 310b, and 310c.

In an example, server 330 may store and retrieve information pertaining to different location-based message streams to and from database 335. Such information may include, but is not limited to, the messages posted by different users to a particular message stream, the specified recipients of the messages posted to the stream, the scope of the message stream and messages associated with the stream, location information for the desired geographic location associated with the message stream, parameters for the corresponding geo-fenced area, and any other user-specified parameters or configuration data associated with a location-based message stream and its corresponding geo-fenced area. The information corresponding to the specified recipients may include, for example, a unique identifier associated with each specified recipient and used to identify the message recipient (e.g., who also may be a user of a social networking service, as described above) and/or a mobile device of the message recipient, e.g., when the device is detected within a geo-fenced area corresponding to the location-based message stream. Additional features of the location-based message stream functionality described above, as provided by the service hosted at server 330 will be described in further detail below with respect to method 400 of FIG. 4.

Figure 4:
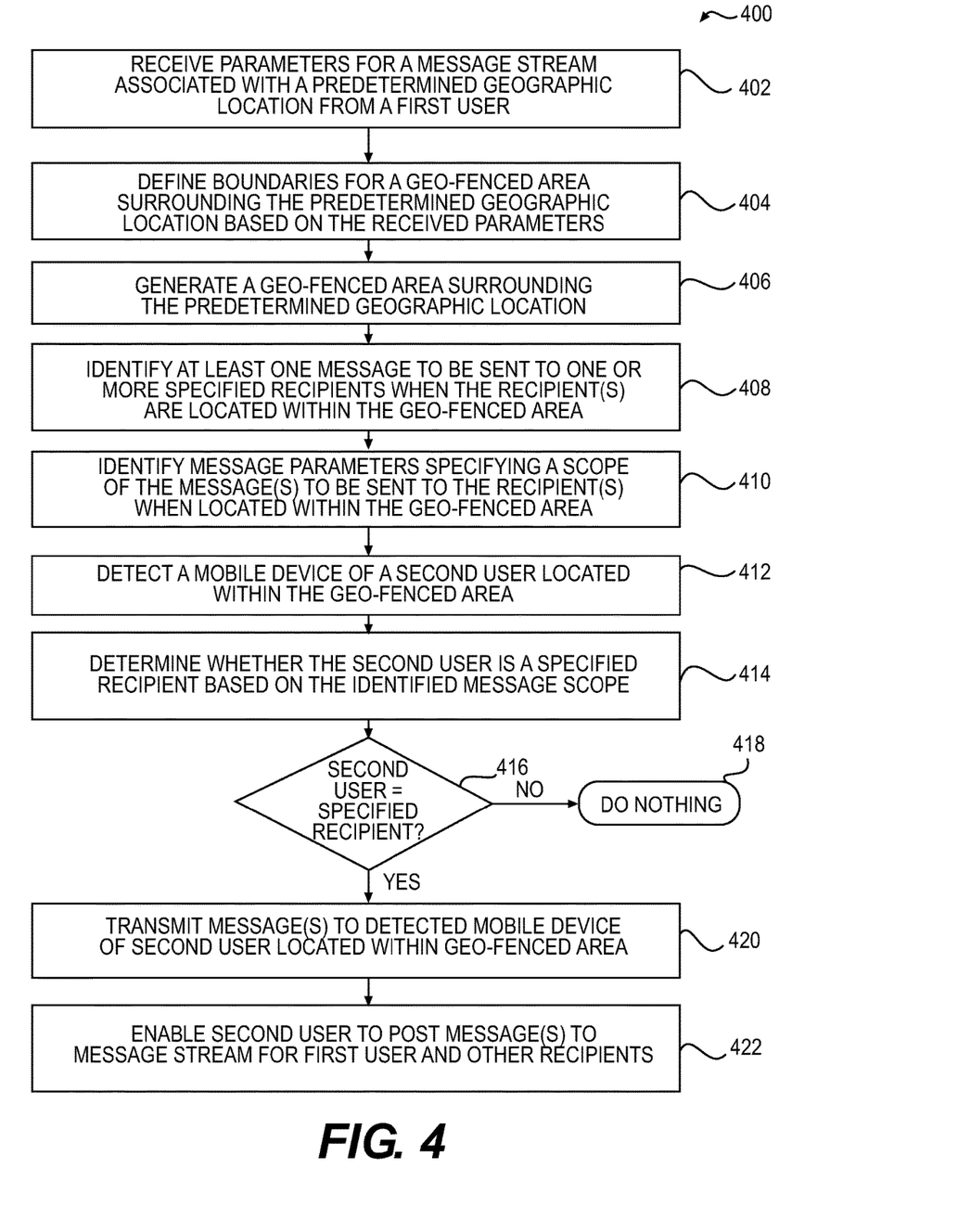
FIG. 4 is a process flowchart of an exemplary method for providing a location-based message stream for users of a social networking service.

FIG. 4 is a process flowchart of an exemplary method 400 for providing a location-based message stream for users of a social networking service. As shown in FIG. 4, method 400 includes steps 402, 404, 406, 408, 410, 412, 414, 416, 418, 420, and 422, as will be described in further detail below. For purposes of discussion, method 400 will be described using system 300 of FIG. 3, as described above. However, method 400 is not intended to be limited thereto. In an example, the above-listed steps of method 400 may be performed by server 330 of FIG. 3, as described above.

Method 400 begins in step 402, which includes receiving parameters for a message stream to be associated with a desired geographic location from a computing device (e.g., mobile device 310*a*, 310*b*, or 310*c* of FIG. 3, as described above) of a first user via a network (e.g., network 320 of FIG. 3). The parameters for the message stream may also include an expiration time of the message stream, after which the message stream and corresponding geo-fenced area are deactivated or removed. The parameters may also include parameters for defining or adjusting a virtual boundary of a geo-fenced area corresponding to the message stream. As described above, such parameters may include user-specified dimensions or a predetermined radius relative to the geographic location associated with the location-based message stream. Accordingly, in step 404, boundaries for the geo-fenced area surrounding the desired geographic location are defined based on the parameters received in step 402. In step 406, the geo-fenced area is generated based on the boundaries defined in step 404.

In addition to the above-described parameters, the parameters received from the first user's device in step 402 may include at least one message to be sent to one or more specified recipients via the message stream. Thus, in step 408, such a message may be identified and extracted from the set of parameters received in step 402. In step 410, message parameters specifying a scope of the message(s) to be sent to the one or more specified recipients are identified. The scope of the message stream and messages within the stream may be, for example, public or private, as described above.

Method 400 then proceeds to step 412, in which a mobile device of a second user located within the geo-fenced area generated in step 406 is detected. In step 414, it is determined whether the second user is a specified recipient of the message(s) of the message stream, which may be based in part on the scope of the message stream identified in step 410. In this context, the scope may be used to determine whether the second user qualifies as a message recipient. In an example, the first user and second user in addition to the one or more message recipients specified by the first user may all be users of a social networking service, as described above. Further, the one or more message recipients specified by the first user may be, for example, members of a predefined social group associated with the first user within the social networking service. Thus, the determination of whether the second user is a specified recipient in step 414 may include determining whether the second user is also a member of the particular social group associated with the first user within the social networking service and selected by the first user as recipients of the message(s) posted to the location-based message stream.

If the second user is determined to be a specified recipient in step 416, method 400 proceeds to step 420, which includes transmitting the message(s) of the message stream to the detected mobile device of the second user. Otherwise, method 400 proceeds to step 418, in which no further action is taken with respect to the location-based message stream or the detected mobile device of the second user.

In some implementations, the determination in step 414 may also include determining whether the second user is subscribed to receive messages via the message stream. For example, the second user may have previously subscribed to enable the location-based message stream functionality at the user's mobile device and thus receive messages posted to the message stream. Further, the user may have enabled an option or setting within a preference panel of the user's mobile device or client application executable at the device for enabling the location-based message stream functionality and authorizing location-based messages to be received at the user's device. Additionally, the user also may have enabled any option or setting for enabling location-based services in general at the user's mobile device. Thus, the message may be transmitted to the mobile device of the second user in step 420, only when the second user or user's mobile device is determined to be subscribed to receive messages via the message stream and the second user is determined in step 414 to be at least one of the one or more specified recipients.

In some implementations, method 400 may also proceed to step 422 for enabling the second user to post one or more messages to the message stream, in which the message recipients may include the first user as well as any remaining message recipients who were originally specified by the first user. In an example, when the second user is determined to be at least one of the specified recipients of the message(s) posted to the location-based message stream, an interface enabling the second user to post one or more additional messages to the location-based message stream may be provided at the detected mobile device for the second user. Such an interface may be provided via, for example, a client application executable at the second user's mobile device. Thus, any additional messages posted by the second user in this example may be transmitted to the respective mobile devices of the first user and any of the other one or more specified recipients when their respective mobile devices are detected within the geo-fenced area associated with the message stream.

In a further example, method 400 may include additional steps (not shown) for receiving additional parameters for a private message stream corresponding to a second geo-fenced area to be generated within the previously generated geo-fenced area and generating the second geo-fenced area within the previously generated geo-fenced area based on the received additional parameters. The additional parameters may be received from, for example, the first user, the second user, or any of the other specified message recipients associated with the initial location-based message stream. Accordingly, the location-based message stream initially created based on parameters specified by the first user may be a message stream having a public scope, so as to avoid any potential conflicts or issues with respect to allowing messages from different private message streams to be provided to users at the same location or within the same geo-fenced area. Thus, the second geo-fenced area corresponding to the new private message stream may be used for transmitting messages having a private scope to qualified message recipients, e.g., as specified by the additional parameters received for this message stream. Further, the previously generated geo-fenced area corresponding to the original message stream may also be used to transmit messages having a public scope to the specified message recipients, e.g., as identified previously in step 408.

Figure 5:
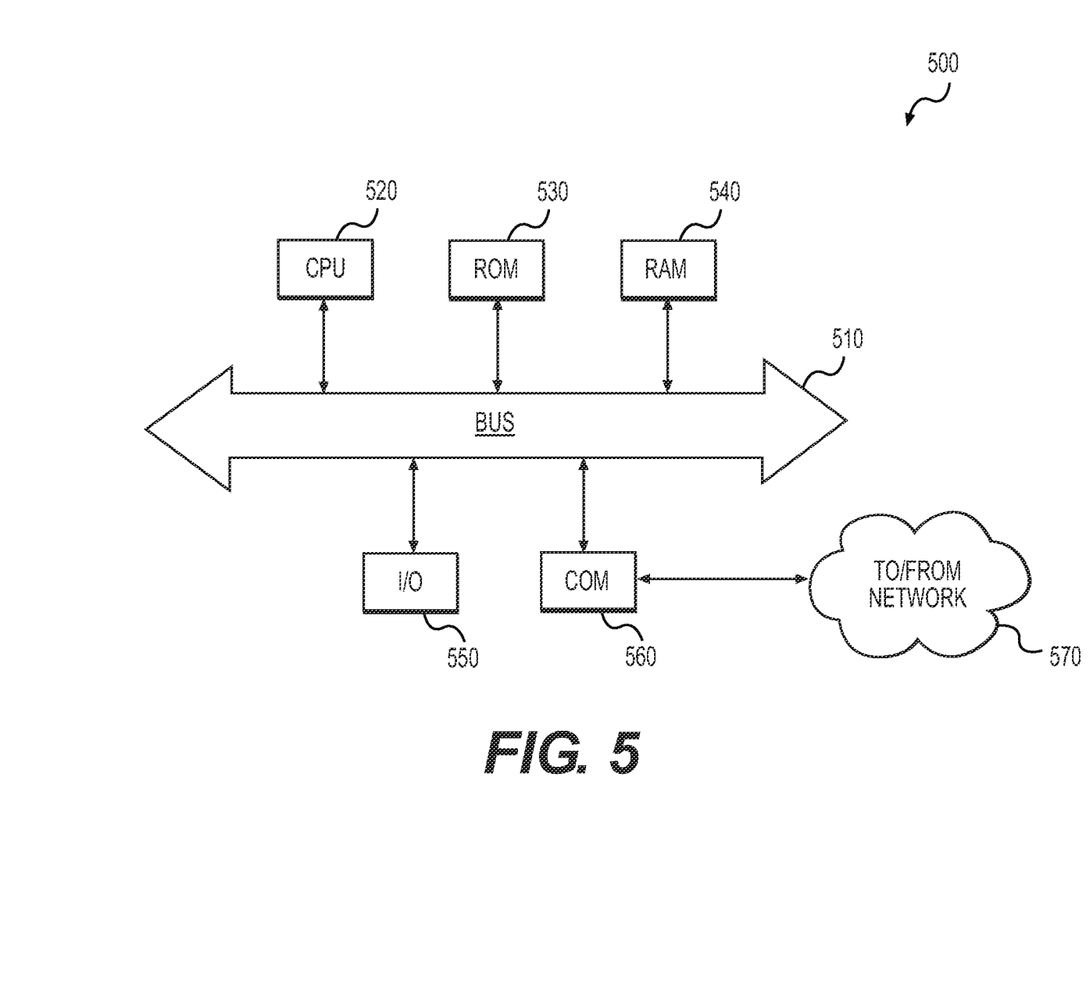
FIG. 5 is a block diagram of an exemplary computer system in which embodiments of the present disclosure may be implemented.

FIG. 5 provides a functional block diagram illustrating an exemplary general purpose computer 500. Computer 500 may be used to implement, for example, a computing platform for a network or host computing device, for example, server 330 of FIG. 3, as described above. In a different example, computer 500 may be used to implement a client device, for example, a mobile computing device, e.g., any of user devices 310a, 310b, or 310c of FIG. 3, also as described above. It is believed that those skilled in the art are familiar with the structure, programming and general operation of such computer devices and equipment, as described below and as shown in FIG. 5. As a result, the general functionality and characteristics of computer 500 as shown in FIG. 5 should be self-explanatory.

A platform for a server or the like, for example, may include a data communication interface for packet data communication 560. The platform may also include a central processing unit (CPU) 520, in the form of one or more processors, for executing program instructions. The platform typically includes an internal communication bus 510, program storage and data storage for various data files to be processed and/or communicated by the platform such as ROM 530 and RAM 540, although the server 500 often receives programming and data via network communications 570. The hardware elements, operating systems and programming languages of such equipment are generally well-known to those skilled in the art.

As shown in FIG. 5, the server 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method, comprising:
receiving, by a device and from a mobile device of a message sending user via a network, parameters for generating a message stream to be associated with a particular geographic location,
the message stream enabling a dissemination of one or more user-generated messages originating from one or more user devices including the mobile device of the message sending user,
the parameters identifying the particular geographic location based on at least one of a distance or a travel time along a route, traveled by the mobile device of the message sending user, relative to a current location along the route of the mobile device of the message sending user,
the particular geographic location corresponding to a location along the route which is ahead of or behind the current location along the route,
the parameters defining a virtual boundary surrounding the particular geographic location,
the parameters including at least one message generated by the message sending user and associated with the particular geographic location to be sent to one or more authorized recipients via the message stream, and
the parameters defining an expiration time;
generating, by the device, a geo-fenced area defined by the virtual boundary surrounding the particular geographic location for the message stream based on the parameters and associating the at least one message generated by the message sending user with the message stream,
the geo-fenced area corresponding to the route traveled by the mobile device of the message sending user, and
the message stream comprising a plurality of messages that are each associated with a respective location, of a plurality of locations, along the route,
the plurality of messages including the at least one message;

detecting, by the device, a presence of a mobile device of a message receiving user within the geo-fenced area of the message stream;

determining, by the device, that the message receiving user is one of the one or more authorized recipients based on detecting the mobile device of the message receiving user within the geo-fenced area of the message stream and based on determining that the message receiving user is the message sending user; and transmitting, by the device, the at least one message to the mobile device of the message receiving user based on determining that the mobile device of the message receiving user is traveling along the route corresponding to the geo-fenced area of the message stream, the transmitting of the at least one message to the mobile device of the message receiving user enabling the message receiving user to view the message stream including the at least one message and to post subsequent messages viewable by the message sending user and the message receiving user detected within the geo-fenced area of the message stream, and the message stream and the geo-fenced area of the message stream being removed after the expiration time.

2. The method of claim 1, further comprising:

determining that the message receiving user is one of the one or more authorized recipients based on determining that the message receiving user is subscribed to receive messages via the message stream.

3. The method of claim 1, wherein each of the message sending user, the message receiving user, and the one or more authorized recipients are users of a social networking service.

4. The method of claim 3, wherein the one or more authorized recipients are members of a predefined social group associated with the message sending user within the social networking service.

5. The method of claim 3, further comprising:

providing, when the message receiving user is determined to be at least one of the one or more authorized recipients, an interface at the mobile device for the message receiving user to add at least one additional message to the message stream, wherein the at least one additional message is transmitted to the mobile device of the message sending user and one or more respective mobile devices of any of the one or more authorized recipients when the mobile device of the message sending user or the one or more respective mobile devices of the one or more authorized recipients are detected within the geo-fenced area of the message stream.

6. The method of claim 3, wherein the parameters for the message stream include a scope of the message stream, the scope specifying which users of the social networking service qualify as the one or more authorized recipients of the at least one message to be transmitted via the message stream.

7. The method of claim 6, wherein the scope of the message stream is either a public scope or a private scope.

8. The method of claim 7, further comprising:

receiving additional parameters for a private message stream corresponding to a message receiving geo-fenced area to be generated within the geo-fenced area of the message stream; and generating the message receiving geo-fenced area within the geo-fenced area of the message stream based on the additional parameters, wherein the message receiving geo-fenced area corresponding to the private message stream is used for transmitting messages having the private scope and the geo-fenced area corresponding to the message stream is used to transmit messages having the public scope.

9. The method of claim 1, wherein the parameters for generating the message stream include a set of location points or dimensions associated with the geo-fenced area, the set of location points or dimensions being generated by a mapping application of the one or more user devices.

10. A device, comprising:

a memory; and a processor, communicatively coupled to the memory, to:

receive, from a mobile device of a message sending user via a network, parameters for generating a message stream to be associated with a particular geographic location, the message stream enabling a dissemination of one or more user-generated messages originating from one or more user devices including the mobile device of the message sending user, the parameters identifying the particular geographic location based on at least one of a distance or a travel time along a route, traveled by the mobile device of the message sending user, relative to a current location along the route of the mobile device of the message sending user, the particular geographic location corresponding to a location along the route which is ahead of or behind the current location along the route, the parameters defining a virtual boundary surrounding the particular geographic location, the parameters including at least one message generated by the message sending user and associated with the particular geographic location to be sent to one or more authorized recipients via the message stream, and the parameters defining an expiration time;

generate a geo-fenced area defined by the virtual boundary surrounding the particular geographic location for the message stream based on the parameters and associating the at least one message generated by the message sending user with the message stream, the geo-fenced area corresponding to the route traveled by the mobile device of the message sending user, and the message stream comprising a plurality of messages that are each associated with a respective location, of a plurality of locations, along the route, the plurality of messages including the at least one message;

detect a presence of a mobile device of a message receiving user within the geo-fenced area of the message stream;

determine that the message receiving user is one of the one or more authorized recipients based on detecting the mobile device of the message receiving user within the geo-fenced area of the message stream and based on determining that the message receiving user is the message sending user; and transmit the at least one message to the mobile device of the message receiving user, based on determining that the mobile device of the message receiving user is traveling along the route corresponding to the geo-fenced area of the message stream,  the transmitting of the at least one message to the mobile device of the message receiving user enabling the message receiving user to view the message stream including the at least one message and to post subsequent messages viewable by the message sending user and the message receiving user detected within the geo-fenced area of the message stream, and  the message stream and the geo-fenced area of the message stream being removed after the expiration time.

11. The device of claim 10, wherein the processor is further to:

determine that the message receiving user is one of the one or more authorized recipients based on determining that the message receiving user is subscribed to receive messages via the message stream.

12. The device of claim 10, wherein each of the message sending user, the message receiving user, and the one or more authorized recipients are members of a social networking service.

13. The device of claim 12, wherein the one or more authorized recipients are members of a predefined social group associated with the message sending user within the social networking service.

14. The device of claim 12, wherein the processor is further to:

provide, when the message receiving user is determined to be at least one of the one or more authorized recipients, an interface at the mobile device for the message receiving user to add at least one additional message to the message stream,   wherein the at least one additional message is transmitted to the mobile device of the message sending user and one or more respective mobile devices of any of the one or more authorized recipients when the mobile device of the message sending user or the one or more respective mobile devices of the one or more authorized recipients are detected within the geo-fenced area of the message stream.

15. The device of claim 12, wherein the parameters for the message stream include a scope of the message stream,  the scope specifying which users of the social networking service qualify as the one or more authorized recipients of the at least one message to be transmitted via the message stream.

16. The device of claim 15, wherein the scope of the message stream is either a public scope or a private scope, and  wherein the processor is further to:

receive additional parameters for a private message stream corresponding to a message receiving geo-fenced area to be generated within the geo-fenced area of the message stream; and   generate the message receiving geo-fenced area within the geo-fenced area of the message stream based on the additional parameters,    wherein the message receiving geo-fenced area corresponding to the private message stream is used for transmitting messages having the private scope and the geo-fenced area corresponding to the message stream is used to transmit messages having the public scope.

17. The device of claim 10, wherein the parameters for generating the message stream include a set of location points or dimensions associated with the geo-fenced area,  the set of location points or dimensions being generated by a mapping application of the one or more user devices.

18. A non-transitory computer readable medium storing instructions that, when executed by a processor, cause the processor to:

receive, from a mobile device of a message sending user via a network, parameters for generating a message stream to be associated with a particular geographic location,   the message stream enabling a dissemination of one or more user-generated messages originating from one or more user devices including the mobile device of the message sending user,   the parameters identifying the particular geographic location based on at least one of a distance or a travel time along a route, traveled by the mobile device of the message sending user, relative to a current location along the route of the mobile device of the message sending user,    the particular geographic location corresponding to a location along the route which is ahead of or behind the current location along the route,   the parameters defining a virtual boundary surrounding the particular geographic location,   the parameters including at least one message generated by the message sending user and associated with the particular geographic location to be sent to one or more authorized recipients via the message stream, and   the parameters defining an expiration time;

generate a geo-fenced area defined by the virtual boundary surrounding the particular geographic location for the message stream based on the parameters and associating the at least one message generated by the message sending user with the message stream,   the geo-fenced area corresponding to the route traveled by the mobile device of the message sending user, and   the message stream comprising a plurality of messages that are each associated with a respective location, of a plurality of locations, along the route,    the plurality of messages including the at least one message;

detect a presence of a mobile device of a message receiving user within the geo-fenced area of the message stream;

determine that the message receiving user is one of the one or more authorized recipients based on detecting the mobile device of the message receiving user within the geo-fenced area of the message stream and based on determining that the message receiving user is the message sending user; and  transmit the at least one message to the mobile device of the message receiving user, based on determining that the mobile device of the message receiving user is traveling along the route corresponding to the geo-fenced area of the message stream, the transmitting of the at least one message to the mobile device of the message receiving user enabling the message receiving user to view the message stream including the at least one message and to post subsequent messages viewable by the message sending user and the message receiving user detected within the geo-fenced area of the message stream, and the message stream and the geo-fenced area of the message stream being removed after the expiration time.

\* \* \* \* \*